Oct. 9, 1934.　　　T. C. KNUDSEN　　　1,976,025
SHEET METAL PULLEY
Filed Aug. 8, 1931

Inventor
T. C. Knudsen
by
Attorney

Patented Oct. 9, 1934

1,976,025

UNITED STATES PATENT OFFICE 1,976,025

SHEET METAL PULLEY

Thomas C. Knudsen, Milwaukee, Wis., assignor to Allis-Chalmers Manufacturing Company, Milwaukee, Wis., a corporation of Delaware Application August 8, 1931, Serial No. 555,895

9 Claims. (Cl. 64—17)

This invention relates in general to the art of pulleys and relates more specifically to an improvement in multiple V-groove pulleys wherein the belt grooves are provided by inclined, annular flanges formed in two sets of circular pressed sheet metal members.

An object of the invention is to provide multiple V-groove pulleys comprising two sets of circular members as related above, the members of one set each having a central disk portion provided with preferably the same diameter circular opening for mounting the same on cylindrical portions of a hub member or directly on cylindrical portions of a power shaft.

Another object of the invention is to provide multiple V-groove pulleys comprising two sets of circular members as related above, wherein each of the members of the set having the central disk portions is provided intermediate its flange and its disk portion with an annular offset or seat portion forming spaced, circumferential seats for corresponding circumferential base portions of concentrically-arranged, annular boxes formed by pairs of oppositely disposed circular, sheet metal ring members constituting the other set of members.

Another object of the invention is to provide multiple V-groove pulleys comprising two sets of circular members, as related above, in which the central disk portions of the seat members are mounted in spaced relation on cylindrical portions of a mounting member to provide the desired stiffness and strength to the pulleys.

Another object of the invention is to provide multiple V-groove pulleys comprising two sets of circular members as related above, in which the box-forming ring members are shaped and arranged so that only two joints are found in each box in tracing around its transverse boundary.

Another object of the invention is to provide multiple V-groove pulleys that are light in weight, compact yet durable and inexpensive to manufacture.

Other objects and advantages of this invention will appear from a reading of the specification and of the drawing accompanying the same and forming a part thereof and on which the same reference numerals are used to designate the same elements and parts throughout the various views.

Figure 1:
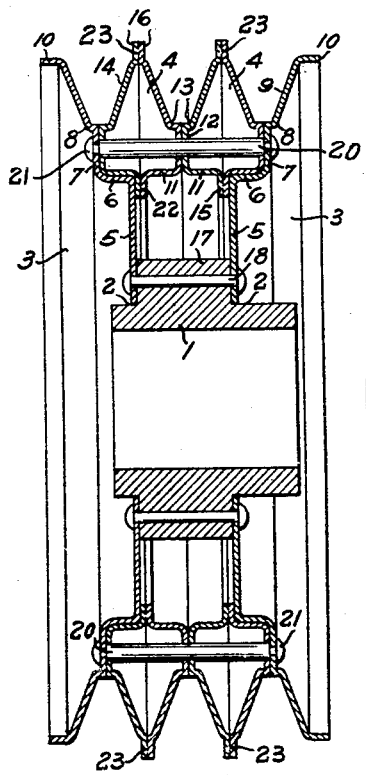
Fig. 1 is a central, axial sectional view through a three-groove pulley constructed according to this invention.
Figure 2:
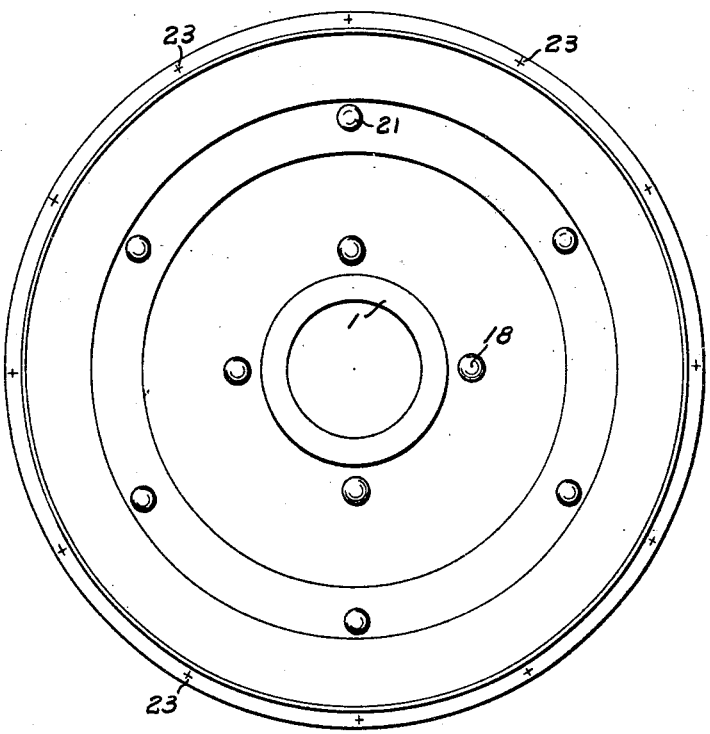
Fig. 2 is a side elevational view of the pulley shown in Fig. 1.

Referring to Fig. 1, reference numeral 1 designates a hub member providing the uniform diameter cylindrical surfaces 2 for mounting the seat members 3 thereon which seat members 3 are provided with central disk portions 5 having circular openings to receive the cylindrical surfaces 2 of the hub member 1. The central disk portions 5 of the seat members 3 terminate in axially directed offset or circumferential seat portions 6 which in turn terminate in side securing portions 7. Side securing portions 7 terminate in shoulders 8 which serve to provide stiffness to the inclined annular flanges 9 terminating therein, as well as to somewhat reduce the necessary length of said flanges. The flanges 9 terminate in axially directed flanges 10 which serve to preclude cutting of the belts operating in the outer grooves of the pulleys, constructed according to this invention, and also to provide greater stiffness and rigidity to the peripheral portions of the pulleys.

The ring members 4 are provided with circumferential base portions 11 of slightly larger diameters than the diameters of the circumferential seat portions 6 of seat members 3, which base portions 11 terminate in side securing portions 12 terminating in shoulders 13 located at substantially the same radical distance as the shoulders 8 of the seat members 3. The inclined, annular flanges 14 formed integrally with said shoulders 13 and terminating therein are directed at the same inclination as the flanges 9 of the seat members 3 and are of the same length. The base portions 11 of the ring members 4 also terminate in diametrically directed contacting flanges 15 located in the same diametrical planes as the similar diametrically directed contacting flanges 16 terminating in the inclined flanges 14.

The ring members 4 are, as seen from Fig. 1, oppositely disposed and have their side securing portions 12 in contacting relation with each other and with adjacent corresponding side securing portions 7 of the seat members 3, and with a given number of boxes formed by pairs of oppositely disposed ring members 4, the disk portions 5 of the seat members 3 are spaced a certain distance. This space may be filled by an annular flange 17 formed on the hub member 1 or alternatively directly by a similar flange of a power shaft. The seat members 3 are held against relative rotation with respect to the hub member 1 by means of rivets 18, or the like, passing through registering, circularly disposed openings in the flange 17, and in the disk portions 5. The boxes formed by the ring members 4 are provided with spot welds 22 and 23 respectively, in their pairs of contacting flanges 15 and 16 and are secured, with a base portion 11 at each outer one of said boxes in seated relation on a corresponding seat portion 6 of the seat members 3, to the side securing portions 7 of the seat members 3 by means of a plurality of rods 20 with reduced diameter ends having their large diameter portions passed through circularly disposed openings in the side securing portions 12 of the ring members 4 and having their reduced diameter ends passed through registering smaller openings in the side securing portions 7 of the seat members 3. The portions of the rods 20 projecting beyond the seat members 3, in their assembled relation, are peened over to form the heads 21. This effectively prevents relative rotation between the boxes and also prevents relative rotation of the boxes with respect to the seat members 3.

Figure 3:
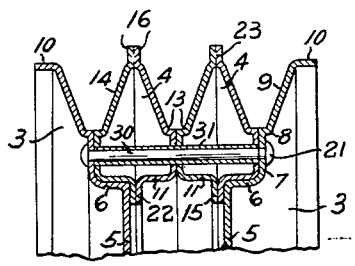
Fig. 3 is a fragmentary central, axial sectional view of the pulley of Fig. 1, showing a modified means for holding the ring and seat members in proper assembled relation.

Reference is made to Fig. 3 in which a modified form of means for securing the boxes, formed by the ring members 4, and the seat members 3 fixedly together, which comprises uniform diameter rods 30 and sleeves 31 mounted thereon passed through circularly disposed openings in the side securing portions 12 of the ring members 4, the rods 30 located within the sleeves 31 being passed through corresponding registering openings in the side securing portions 7 of the seat members 3 and the projecting portions of rods 30 being peened over to form heads 21. The rods 20, and the rods and cooperating sleeves 30 and 31 of the modified form of securing means shown in Fig. 3 additionally serve to maintain the side securing portions 7 of the seat members 3 in proper spaced relation and to secure the boxes, formed by the ring members 3, and the seat members 3 together.

It will be observed that by merely inserting or removing a pair of ring members 4, forming a box, that a greater or a lesser number of grooves on the pulley will result. The addition of boxes to form additional grooves greater in number than those shown may be carried out, within practical limits.

From the above description, it will be seen that applicant has devised a type of multiple V-groove pulley which utilizes the advantages inherent in a box construction, that there are only two joints necessary in forming each of said boxes, that by providing said boxes a light yet rigid pulley construction results, and that by forming and arranging the seat and ring members 3, 4 as disclosed the spacing of the disk portions 5 is utilized to provide stiffness and strength to the pulley.

It should be understood that it is not desired to limit the invention to the exact details of construction herein shown and described, for various modifications within the scope of the claims may occur to persons skilled in the art.

It is claimed and desired to secure by Letters Patent:

1. In a pulley, a pair of spaced, oppositely disposed sheet metal members, each of said members having an inclined, annular peripheral flange and a central disk portion, each of said members being further provided with a circumferential portion and a side securing portion, a closed annular box formed of sheet metal ring members having each an inclined, annular peripheral flange, a side securing portion and a circumferential portion, said box being positioned between and supported solely by said spaced members, a side securing portion of said box and a corresponding circumferential portion thereof respectively, engaging and closely surrounding the corresponding portions of one of said spaced members, and means for securing said box and said spaced members together.

2. In a pulley, a pair of spaced, oppositely disposed sheet metal members, each of said members having an inclined, annular peripheral flange and a central disk portion and being provided with a longitudinally offset portion intermediate its flange and its disk portion, a plurality of concentrically arranged closed annular boxes positioned between said spaced members, each of said boxes being formed of oppositely disposed sheet metal ring members each having an inclined, annular peripheral flange and a longitudinally offset portion, the offset portions of said spaced members being surrounded by and engaging the corresponding offset portions of said boxes and forming the sole support for said boxes, and means for securing said boxes and said spaced members together.

3. In a pulley, a pair of spaced, oppositely disposed sheet metal members, each of said members having an inclined, annular flange and a central disk portion and being provided with a side securing portion intermediate its flange and its disk portion, a plurality of concentrically arranged closed annular boxes positioned between said spaced members, each of said boxes being formed of oppositely disposed sheet metal ring members each having an inclined annular flange and a side securing portion, the side securing portions of said boxes and of said spaced members being in axial registration, a hub for supporting and maintaining the side securing portions of said spaced members in proper spaced relation and means for securing the boxes and the spaced members together to constitute the spaced members the sole supporting means for said boxes.

4. In a pulley, a pair of oppositely disposed seat members, each of said members having an inclined, annular flange and a central disk portion, and a closed annular box having oppositely inclined, annular flanges, said box being positioned between and supported by said members only, said disk portions of said members being in spaced relation.

5. In a pulley, a pair of oppositely disposed sheet metal members, each of said members having an inclined, annular flange and a central disk portion, a plurality of concentrically arranged annular boxes each having oppositely disposed inclined, annular flanges, said boxes being supported solely through portions of said members located intermediate their flanges and their disk portions.

6. In a pulley, a pair of oppositely disposed seat members, each of said members having an inclined, annular flange and a central disk portion, a plurality of concentrically arranged annular boxes each having oppositely inclined, annular flanges, said boxes being positioned between and supported solely through said members, said disk portions being in spaced relation, and means for mounting said seat members and maintaining the disk portions thereof in proper spaced relation.

7. In a pulley, a pair of opposite disposed seat members, each of said members having an inclined, annular flange, and a plurality of concentrically arranged annular boxes positioned between and supported solely through said members, each box having oppositely inclined, annular flanges and each of said boxes having but two joints in its transverse boundary.

8. A grooved transmission pulley, comprising a hub, a pair of spaced oppositely disposed plates carried by said hub and each having an outwardly inclined peripheral flange a central disk portion and a longitudinally offset annular flange intermediate the inclined flange and the disk portion, and a pair of contacting and oppositely arranged annular sections disposed between said plates and joined at their peripheries from which they diverge inwardly to form with the inclined flanges of the spaced plates the sides of adjacent grooves and then approach each other in offset longitudinal flanges which terminate in contacting portions to form a closed rigid annular structure supported between and entirely by said spaced oppositely disposed plates.

9. A grooved transmission pulley, comprising a pair of oppositely arranged and contacting annular sheet metal sections joined at their peripheries from which they diverge inwardly to form sides of adjacent grooves and then approach each other in longitudinally disposed flanges which terminate in mutually contacting portions to form a rigid closed annular structure, a pair of oppositely arranged and spaced sheet metal plates each having an outwardly inclined peripheral flange disposed to cooperate with the diverging sides of the contacting sections to define grooves of V-shape and each having a longitudinally disposed flange disposed to fit within the longitudinal flanges of the contacting sections to constitute the sole support for said sections, means for connecting said plates to said sections, and a hub secured centrally of said spaced plates to support the structure.

THOMAS C. KNUDSEN.